(12) United States Patent
Chen et al.

(10) Patent No.: US 11,778,427 B2
(45) Date of Patent: Oct. 3, 2023

(54) GROUP VOICE COMMUNICATION OF WALKIE-TALKIE MODE IN BLUETOOTH COMMUNICATION SYSTEM

(71) Applicant: PixArt Imaging Inc., Hsin-Chu (TW)

(72) Inventors: Shih-Feng Chen, Hsin-Chu (TW); Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 345 days.

(21) Appl. No.: 17/016,357

(22) Filed: Sep. 9, 2020

(65) Prior Publication Data

US 2022/0078584 A1  Mar. 10, 2022

(51) Int. Cl.
| | |
|---|---|
| H04W 4/10 | (2009.01) |
| H04W 4/80 | (2018.01) |
| H04B 1/3827 | (2015.01) |
| H04L 61/50 | (2022.01) |
| H04L 101/622 | (2022.01) |

(52) U.S. Cl.
CPC .............. *H04W 4/10* (2013.01); *H04B 1/385* (2013.01); *H04L 61/50* (2022.05); *H04W 4/80* (2018.02); *H04L 2101/622* (2022.05)

(58) Field of Classification Search
CPC .................................. H04W 1/10; H04W 1/80
See application file for complete search history.

(56) References Cited

U.S. PATENT DOCUMENTS

| | | | | |
|---|---|---|---|---|
| 9,877,098 | B1 * | 1/2018 | Riley | H04R 5/033 |
| 10,200,803 | B1 * | 2/2019 | Tong | H04S 1/005 |
| 10,938,873 | B2 * | 3/2021 | Celinski | H04M 3/563 |
| 11,153,678 | B1 * | 10/2021 | Jorgovanovic | H04W 76/14 |
| 2008/0171567 | A1 * | 7/2008 | Kossi | H04W 88/04 |
| | | | | 455/518 |
| 2013/0166298 | A1 * | 6/2013 | Harada | G01S 3/8083 |
| | | | | 704/E17.001 |
| 2014/0221039 | A1 * | 8/2014 | Liao | H04M 1/72412 |
| | | | | 455/550.1 |
| 2016/0094700 | A1 * | 3/2016 | Lee | H04W 4/80 |
| | | | | 455/419 |
| 2016/0162252 | A1 * | 6/2016 | Di Censo | H04W 4/023 |
| | | | | 700/94 |
| 2016/0182437 | A1 * | 6/2016 | Horie | H04L 51/52 |
| | | | | 709/206 |
| 2017/0193306 | A1 * | 7/2017 | Robil | G06V 40/173 |
| 2018/0176717 | A1 * | 6/2018 | Fu | H04W 4/80 |
| 2018/0289095 | A1 * | 10/2018 | Catterson | A42B 3/0453 |

(Continued)

*Primary Examiner* — Wen W Huang
(74) *Attorney, Agent, or Firm* — Winston Hsu

(57) ABSTRACT

A voice communication method between two or more wearable electronic devices via Bluetooth communication includes: providing the two or more wearable electronic devices paired with a mobile phone device; determining whether a distance between the two or more wearable electronic devices is larger than a distance threshold; controlling a wearable electronic device to enter a walkie-talkie mode to start a walkie-talkie conversation with one or more other wearable electronic devices when the distance is larger than the distance threshold; and during the walkie-talkie mode using the such wearable electronic device to send voice data from the wearable electronic device to one or more other wearable electronic devices to make the other wearable electronic device(s) to receive and play the voice data in the walkie-talkie mode for different user(s).

14 Claims, 7 Drawing Sheets

(56) References Cited

U.S. PATENT DOCUMENTS

| | | | |
|---|---|---|---|
| 2019/0230738 A1* | 7/2019 | Desai | H04L 1/1887 |
| 2020/0244790 A1* | 7/2020 | Sun | H04Q 5/24 |
| 2021/0044941 A1* | 2/2021 | Park | H04M 9/02 |
| 2021/0104992 A1* | 4/2021 | Cooper | H03G 5/165 |

* cited by examiner

GROUP VOICE COMMUNICATION OF WALKIE-TALKIE MODE IN BLUETOOTH COMMUNICATION SYSTEM

BACKGROUND OF THE INVENTION

1. Field of the Invention

The invention relates to a group voice communication scheme, and more particularly to a group voice communication method in a Bluetooth communication system and corresponding wearable electronic device.

2. Description of the Prior Art

Generally speaking, a conventional earphone device supporting Bluetooth communication is usually used for playing audio of music streams for a user by receiving the music streams transmitted from a mobile phone device and/or another earphone device. However, the conventional earphone device cannot be used by a user to perform group voice communication with different persons respectively operating different earphone devices via Bluetooth communications.

SUMMARY OF THE INVENTION

Therefore one of the objectives of the invention is to provide a group voice communication method in a Bluetooth communication system and corresponding wearable electronic device such as earphone device, to achieve group voice communication of a walkie-talkie mode in the Bluetooth communication system so as to solve the above-mentioned problems.

According to embodiments of the invention, a voice communication method between a first wearable electronic device and at least one second wearable electronic device via Bluetooth communication is disclosed. The method comprises: providing the first wearable electronic device paired with a mobile phone device and the at least one second wearable electronic device paired with the mobile phone device; determining whether a distance between the first wearable electronic device and the at least one second wearable electronic device is larger than a distance threshold; controlling the first wearable electronic device to enter a walkie-talkie mode to start a walkie-talkie conversation with the at least one second wearable electronic device when the distance is larger than the distance threshold; and during the walkie-talkie mode using the first wearable electronic device to send voice data from the first wearable electronic device to the at least one second wearable electronic device to make the at least one second wearable electronic device to receive and play the voice data in the walkie-talkie mode for at least one different user.

According to the embodiments, a voice communication method between a first wearable electronic device and at least one second wearable electronic device via Bluetooth communication standard is disclosed. The method comprises: providing the first wearable electronic device paired with a first mobile phone device and the at least one second wearable electronic device paired with at least one second mobile phone device; determining whether a distance between the first wearable electronic device and the at least one second wearable electronic device is larger than a distance threshold; controlling the first wearable electronic device to enter a walkie-talkie mode to start a walkie-talkie conversation with the at least one second wearable electronic device when the distance is larger than the distance threshold; and during the walkie-talkie mode using the first wearable electronic device to send voice data from the first wearable electronic device to the at least one second wearable electronic device to make the at least one second wearable electronic device receive and play the voice data in the walkie-talkie mode for at least one different user.

According to the embodiments, a first wearable electronic device which is paired with a mobile phone device that is paired with at least one second wearable electronic device is disclosed. The first wearable electronic device is capable of communicating with the at least one second wearable electronic device and comprises a communication circuit and a processing circuit. The communication circuit is arranged for sensing a Bluetooth radio-frequency signal sent from the at least one second wearable electronic device. The processing circuit is coupled to the communication circuit and arranged for: determining whether a distance between the first wearable electronic device and the at least one second wearable electronic device is larger than a distance threshold by detecting the Bluetooth radio-frequency signal; controlling the first wearable electronic device to enter a walkie-talkie mode to start a walkie-talkie conversation with the at least one second wearable electronic device when the distance is larger than the distance threshold; and during the walkie-talkie mode using the communication circuit to send voice data from the first wearable electronic device to the at least one second wearable electronic device to make the at least one second wearable electronic device receive and play the voice data for at least one different user.

According to the embodiments, a first wearable electronic device which is paired with a mobile phone device which is communicate with at least one second mobile phone device via Bluetooth communication or internet communication is disclosed. The at least one second mobile phone device is paired with at least one second wearable electronic device, and the first wearable electronic device comprises a communication circuit and a processing circuit. The communication circuit is arranged for sensing a Bluetooth radio-frequency signal sent from the at least one second wearable electronic device. The processing circuit is coupled to the communication circuit and is arranged for: determining whether a distance between the first wearable electronic device and the at least one second wearable electronic device is larger than a distance threshold; controlling the first wearable electronic device to enter a walkie-talkie mode to start a walkie-talkie conversation with the at least one second wearable electronic device when the distance is larger than the distance threshold; and during the walkie-talkie mode using the communication circuit to send voice data of the first wearable electronic device to the at least one second wearable electronic device to make the at least one second wearable electronic device receive and play the voice data for at least one different user.

According to the embodiments, a method applied into a first wearable electronic device which is capable of communicating with at least one second wearable electronic device or a stationary locator station via Bluetooth communication is disclosed. The method comprises: providing the first wearable electronic device paired with a first mobile phone device; using at least one of a distance detection and a direction finding operation in the first wearable electronic device to determine whether a first person using the first wearable electronic device contacts at least one second person using the at least one second wearable electronic device; and controlling the first wearable electronic device to record unique information corresponding to the at least one second wearable electronic device as contact information when it is determined that the first person contacts the at least one second person; the contact information is used to generate a contact/travel history of the first person using/carrying the first wearable electronic device.

According to the embodiments, a first wearable electronic device which is capable of communicating with at least one second wearable electronic device via Bluetooth communication is disclosed. The first wearable electronic device is to be paired with a first mobile phone device and comprises a processing circuit and a memory. The processing circuit is configured for using at least one of a distance detection and a direction finding operation in the first wearable electronic device to determine a first person using the first wearable electronic device contacts at least one second person using the at least one second wearable electronic device. The memory is coupled to the processing circuit, and is configured for recording or storing unique information corresponding to the at least one second wearable electronic device as contact information when it is determined that the first person contacts the at least one second person. The contact information is used to generate a contact/travel history of the first person using/carrying the first wearable electronic device.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a Bluetooth communication method and wearable electronic device implemented as a wearable/portable electronic device which can be worn or used by a user, to support both of an audio/voice playing mode and a walkie-talkie mode. Such wearable/portable electronic device can automatically switch from the audio/voice playing mode to the walkie-talkie mode and switch back to the audio/voice playing mode from the walkie-talkie mode, so that the wearable/portable electronic device can intelligently provide the operations and functions of the audio/voice playing mode and walkie-talkie mode in different situations respectively for different applications of users.

Figure 1:
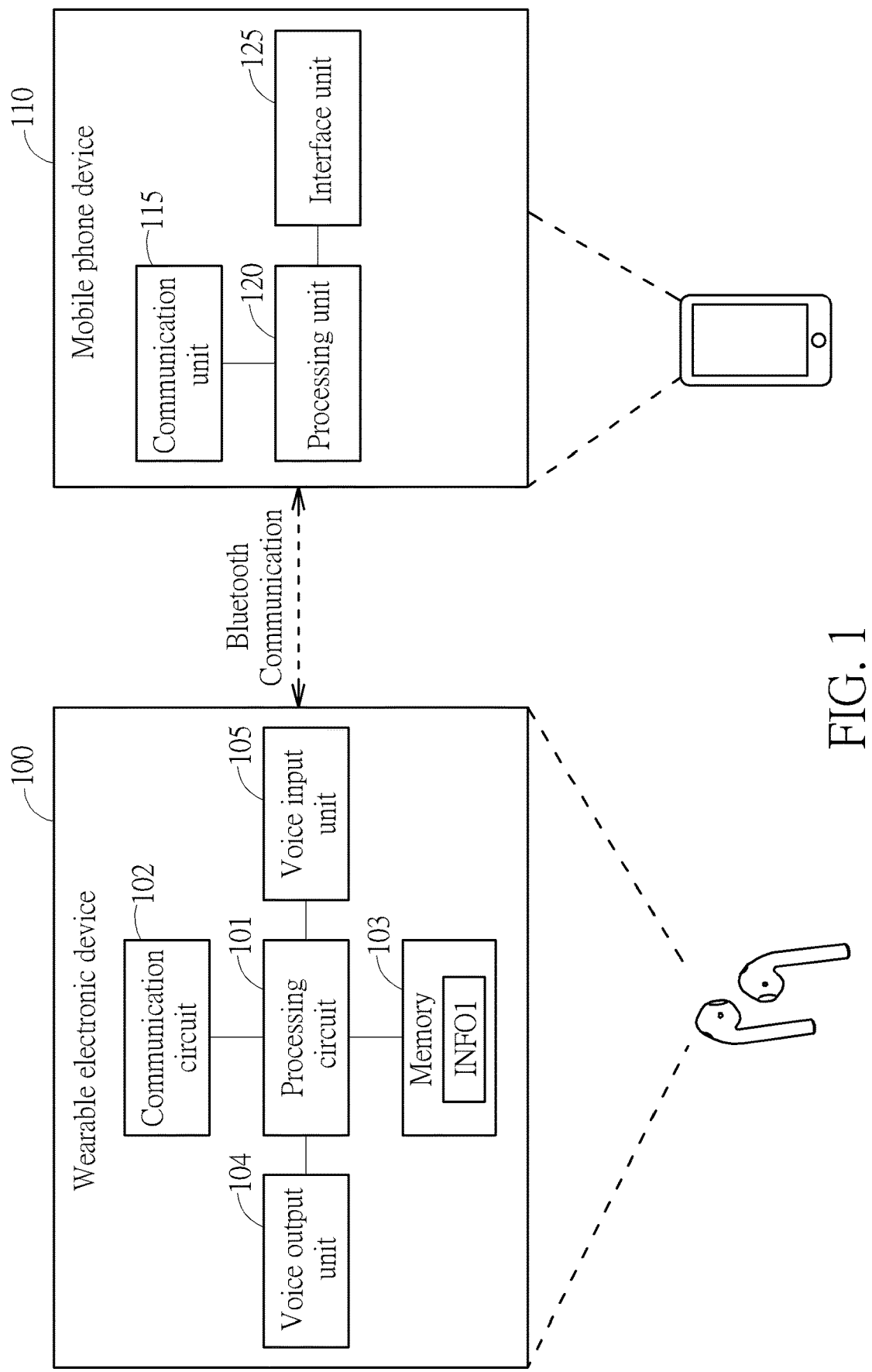
FIG. 1 is a schematic block diagram of a wearable/portable electronic device and a mobile phone device according to an embodiment of the invention.
Figure 2:
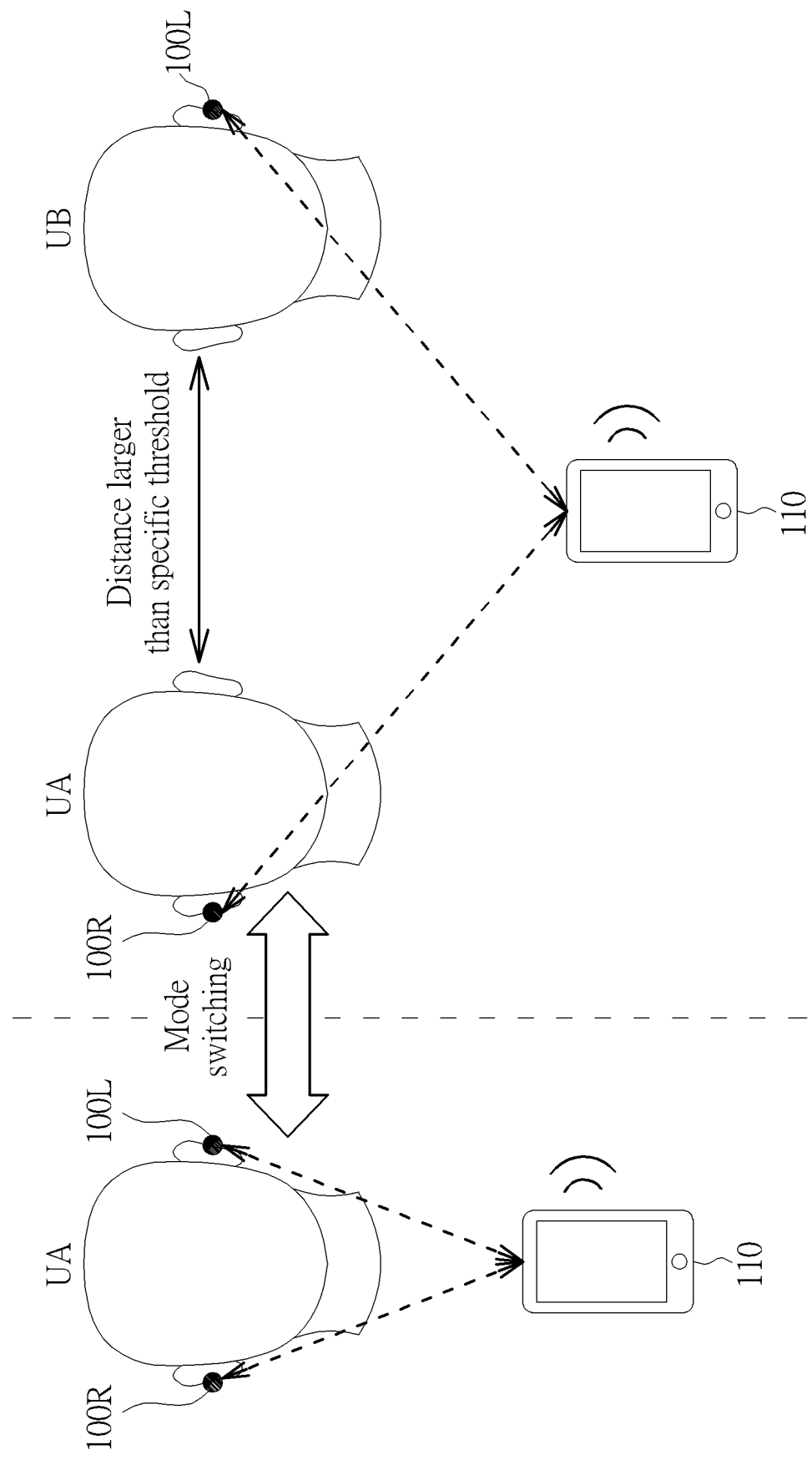
FIG. 2 is a diagram showing the operations of mode switching when the wearable electronic device is used to implement the two earphone devices such as an earphone device for user's right ear and an earphone device for a user's left ear according to an embodiment of the invention.

Refer to FIG. 1 in conjunction with FIG. 2. FIG. 1 is a schematic block diagram of a wearable/portable electronic device 100 and a mobile phone device 110 according to an embodiment of the invention. FIG. 2 is a diagram showing the operations of mode switching when the wearable electronic device 100 is used to implement the two earphone devices such as an earphone device 100R for user's right ear and an earphone device 100L for a user's left ear according to an embodiment of the invention. Each of earphone devices 100R and 100L comprise the same circuit components of the wearable electronic device 100. The earphone devices may support true wireless stereo functions and operations.

In FIG. 1, the wearable/portable electronic device 100 for example is an earphone/earbud device used for the left/right ear of a user (but not limited) and having Bluetooth communication capability to communicate with the mobile phone device 110; the earphone device 100 is successfully paired with the mobile phone device 110 via the Bluetooth communication. The earphone device 100 comprises a processing circuit 101 such as a microcontroller (MCU), a communication circuit 102 supporting Bluetooth communication capability, a memory 103 used for storing or recording unique information in the database INFO1 used in the walkie-talkie mode, a voice output unit 104 such as a speaker, and a voice input unit 105 such as a microphone unit. For example, the information database INFO1 recorded in the wearable electronic device 100 may comprise media access control (MAC) address(es), device identification (ID), name information (comprising device names and/or usernames), and/or other unique information of one or more other different wearable electronic devices in the same walkie-talkie group of the walkie-talkie mode which the wearable electronic device 100 also belongs to wherein the different wearable electronic device(s) may be paired with or not paired with the mobile phone device 110. The information of device names and/or usernames recorded in the information database INFO1 can be used to indicate multiple different walkie-talkie groups and name information of members in each walkie-talkie group so that a user operating and using the wearable electronic device 100 can know which persons may hear his sounds/voices. The operations associated with information database INFO1 are described in other paragraphs later.

The mobile phone device 110 comprises a communication unit 115, a processing unit 120, and an interface unit 125. The communication unit 115 is used for communicating with the wearable electronic devices 100L and 100R respectively via Bluetooth communications to transfer or relay signals. The processing unit 120 is arranged to control the communication unit 115. The processing unit 120 for example is a digital processor or may be a central processing unit (CPU) implemented by hardware components, firmware components, software components, or a combination of hardware, firmware, and software components. The communication unit 115 may comprise a portion of communication circuits capable of supporting the Bluetooth communication standard, IEEE 802.11 family of standards, and/or wires broadband communication or mobile communication standard. In practice, the communication unit 115 may be a single integrated circuit which supports the Bluetooth communication standard, IEEE 802.11 family of standards, or wireless broadband communication or mobile communication standard. Alternatively, the communication unit 115 may comprise multiple integrated circuits supporting different communication standards. This is not intended to be a limitation. In addition, the interface unit 125 is a user interface which can be operated by a user to activate or execute one or more mobile/software applications running on and executed by the processing unit 120.

The earphone device 100 comprises the audio playing mode and the walkie-talkie mode. The processing circuit 101 can determine the distance between the earphone device 100 itself and at least one wearable electronic device (e.g. one or more different earphone devices) which is also successfully paired with the mobile phone device 110. The earphone device 100 can determine whether the distance is larger than a specific distance threshold TH to determine whether to perform mode switching between the audio playing mode and walkie-talkie mode according to the determined distance. For example, in FIG. 2 the earphone device 100R can detect the signal power of a Bluetooth signal sent from another earphone device 100L to determine whether the distance between two earphone devices 100R and 100L is larger than the specific distance threshold TH.

In practice, the processing circuit 101 can control the communication circuit 102 to real-timely or periodically detect the signal power (e.g. radio-frequency power level) of the Bluetooth radio-frequency signal sent from at least one another earphone device such as earphone device paired with the mobile phone device 110 and then to calculate/estimate the distance between the earphone devices based on the magnitude of detected signal power. Alternatively, in other embodiments, the processing circuit 101 can use a Bluetooth direction finding operation to detect the angle of arrival/departure of the Bluetooth signal sent from one or more different earphone devices paired with the mobile phone device 110 to determine or calculate the distance. Alternatively, in other embodiments, the processing circuit 101 may use connection signal information carried in the Bluetooth signal sent from the one or more different earphone devices to determine or calculate the distance.

In addition, the specific distance threshold TH for example is equal to three meters (but not limited). In one embodiment, the specific distance threshold TH may be different and determined by different users respectively.

The processing circuit 101 is arranged to compare the determined/calculated distance with the specific distance threshold TH to determine whether to perform mode switching. If the distance is smaller than the specific distance threshold TH, then the processing circuit 101 may determine that the earphone device 100 and the other earphone device(s) in this situation may be used by the same user/person to listen to music or may be used by different users/person which are near to share and listen to the music. The processing circuit 101 thus determines that the earphone device 100 is in the audio playing mode or kept in the audio playing mode. Refer to FIG. 2 again. In the example of the left of FIG. 2, the calculated distance is smaller than the specific distance threshold TH, and the earphone devices 100R and 100L (respectively implemented by the wearable electronic device 100) determines to keep in the audio playing mode. In the audio playing mode, the mobile phone device 110 may send audio (mono or stereo channel) packet stream(s) to the earphone devices 100L and 100R, and the communication circuits 102 in the earphone devices 100L and 100R can receive audio packet stream(s) sent from the mobile phone device 110 respectively. In another embodiment, one earphone device such as earphone device 100L (but not limited) if used as a slave can receive audio packet stream sent from the mobile phone device 110 and relayed by the other earphone device 100R if used as a master. In the left of FIG. 2, the processing circuits 101 in the earphone devices 100L and 100R can control the corresponding voice output units 104 (i.e. speakers) to respectively play audio/sound/music of left channel and right channel for the same user UA based on the received audio packet stream(s) sent from the corresponding communication circuits 102.

When the distance is larger than the specific distance threshold TH, the processing circuit 101 may determine that the wearable electronic device 100 and other electronic device(s) may be used by different users/persons which are not near to, and thus may determine to control the wearable electronic device 100 enter the walkie-talkie mode to start a walkie-talkie conversation with one or more persons. For example, in the right of FIG. 2, the processing circuits 101 of wearable electronic devices 100 (respectively implement the earphone devices 100R and 100L) may determine to enter the walkie-talkie mode when the distance between the two earphone devices 100R and 100L is larger than the specific distance threshold TH. In this situation, the processing circuits 101 in two earphone devices 100R and 100L may determine that the earphone devices 100R and 100L may be worn by different users UA and UB and thus may respectively control the earphone devices 100R and 100L enter the walkie-talkie mode to perform group voice communications between the different users such as UA and UB in the walkie-talkie mode. The processing circuits 101 may automatically and/or simultaneously control the earphone devices 100R and 100L enter the walkie-talkie mode once the distance mentioned above becomes larger than the specific distance threshold TH. The processing circuits 101 may automatically and/or simultaneously control the earphone devices 100R and 100L switchback to the audio playing mode from the walkie-talkie mode once the distance mentioned above becomes smaller than the specific distance threshold TH.

Further, in one embodiment, the group voice communication of the walkie-talkie mode may be triggered or by one earphone device when detecting that the distance is larger than the specific distance threshold TH, and this needs to be allowed or accepted by one or more other earphone devices later to establish the group voice communication. For example, in FIG. 2, the earphone devices 100R and 100L can negotiate with each other to determine whether to enter the walkie-talkie mode, instead of automatically switching to the walkie-talkie mode. For instance, when detecting that the distance is larger than the distance threshold TH, the processing circuit 101 of an earphone device such as 100R may control the voice output unit 104 to play a voice message for the user UA to check whether the user UA wants to enter the walkie-talkie mode. The user UA for example may make a voice control command, tap, or click the earphone device 100R to confirm or reject such voice message; the processing circuit 101 can use the voice input unit 105 to receive the voice control command. If the user UA confirms the walkie-talkie mode, then the processing circuit 101 in the earphone device 100R controls the communication circuit 102 to generate and send a request signal (used for requesting enter the walkie-talkie mode) from the earphone device 100R to the other earphone device 100L via direct Bluetooth communication if the earphone devices are also paired or from the earphone device 100R to the other earphone device 100L via the mobile phone device 110 if the earphone devices are not paired.

For the earphone device 100L, when receiving the request signal of the earphone device 100R, the processing circuit 101 in the earphone device 100L is arranged to control the corresponding voice output unit 104 to play a voice message of such request signal for the user UB so that the user UB can accept or reject such request by making a voice control command, tap, or click the earphone device 100L; the corresponding voice input unit 105 in the earphone device 100L can receive the voice control command of the user UB. If such request signal is accepted by the user UB, then the processing circuit 101 in the earphone device 100L controls the corresponding communication circuit 102 to generate and send a response signal from the earphone device 100L to the other earphone device 100R via direct Bluetooth communication if the earphone devices are also paired or from the earphone device 100L to the other earphone device 100R via the mobile phone device 110 if the earphone devices are not paired. If the response signal indicates that the user UB accepts the walkie-talkie mode, then the earphone devices 100R and 100L can enter the walkie-talkie mode so that the users UA and UB can respectively use the earphone devices 100R and 100L to perform group voice communication. The voice data (e.g. voice packet(s)) of the group voice communication may be relayed via the mobile phone device 110 or can be directly transmitted between the earphone devices 100R and 100L. For example, the voice data of walkie-talkie conversation may be instead transferred via the mobile phone device if direct transmission of the voice data between the two wearable electronic devices (i.e. earphone devices 100R and 100L) fails.

That is, when an earphone device implemented by the wearable electronic device 100 detects that the distance between such earphone device and other earphone device(s) is larger than the specific distance threshold, the earphone device can automatically enter the walkie-talkie mode or can play a voice auxiliary message for a user so that the user can choose whether to enter the walkie-talkie mode by himself. Thus, the earphone devices 100R and 100L, implemented by the wearable electronic device 100, can provide the flexibility for the users UA and UB to keep in the audio playing mode and not to enter the walkie-talkie mode even though the distance between the earphone devices 100R and 100L is larger.

When the earphone devices 100R and 100L are in the walkie-talkie mode, the processing circuit 101 in each earphone devices 100R and 100L can control the corresponding communication circuit to generate and transmit a voice packet signal in response to voices/sounds of users UA/UB wherein the voices/sounds can be sensed, received, and encapsulated by the corresponding voice input units 105 to generate voice packet signals. For the mobile phone device 110, the processing unit 120 controls the communication unit 115 to transfer and relay the voice packet signal, sent from the earphone device such as 100R, to the other earphone device such as 100L. When receiving the voice packet signal relayed from the mobile phone device 110, the processing circuits 101 in each earphone devices 100R and 100L can control the corresponding voice output units 104 to play voices/sounds of the other users for the current users. In practice, playing the voice packet signal may use the telephone mode of the mobile phone device 110 to automatically and directly interrupt the operation(s) currently executed by the earphone device such as 100L. That is, when the earphone device 100L is in the walkie-talkie mode, the earphone device 100L can be automatically interrupted to play the voice packet signal from the earphone device 100R.

It should be noted that, in the embodiment of FIG. 2, when the user UA operates the earphone devices 100R and 100L in the audio playing mode (i.e. the distance between two earphone device is smaller than the specific distance threshold TH, and more particularly is smaller than an extremely threshold smaller than TH), the earphone devices 100R and 100L can be classified into the same voice communication group by the user UA, the earphone devices 100R and 100L exchange and share the MAC addresses of the earphone devices 100R and 100L, MAC address of the mobile phone device 110, and other unique information. For example, the information of database INFO1 respectively recorded in each of the earphone devices 100R and 100L may be represented by the following table:

| Group info | Address of Member device | Address of mobile phone | Name info |
|---|---|---|---|
| A | ADDR_L | ADDR_110 | N_L |
|   | ADDR_R | ADDR_110 | N_R |

In the table, the walkie-talkie group 'A' for example comprises two member devices (e.g. earphone devices 100L and 100R) having the MAC addresses ADDR_L and ADDR_R, the same MAC address ADDR_110 of the mobile phone device 110, and different name information such as N_L and N_R respectively representing left ear and right ear. It is noted, the information database INFO1 may be not needed to be used. That is, the information database INFO1 is optional in the above embodiment; however, this is not intended to be a limitation.

Figure 3:
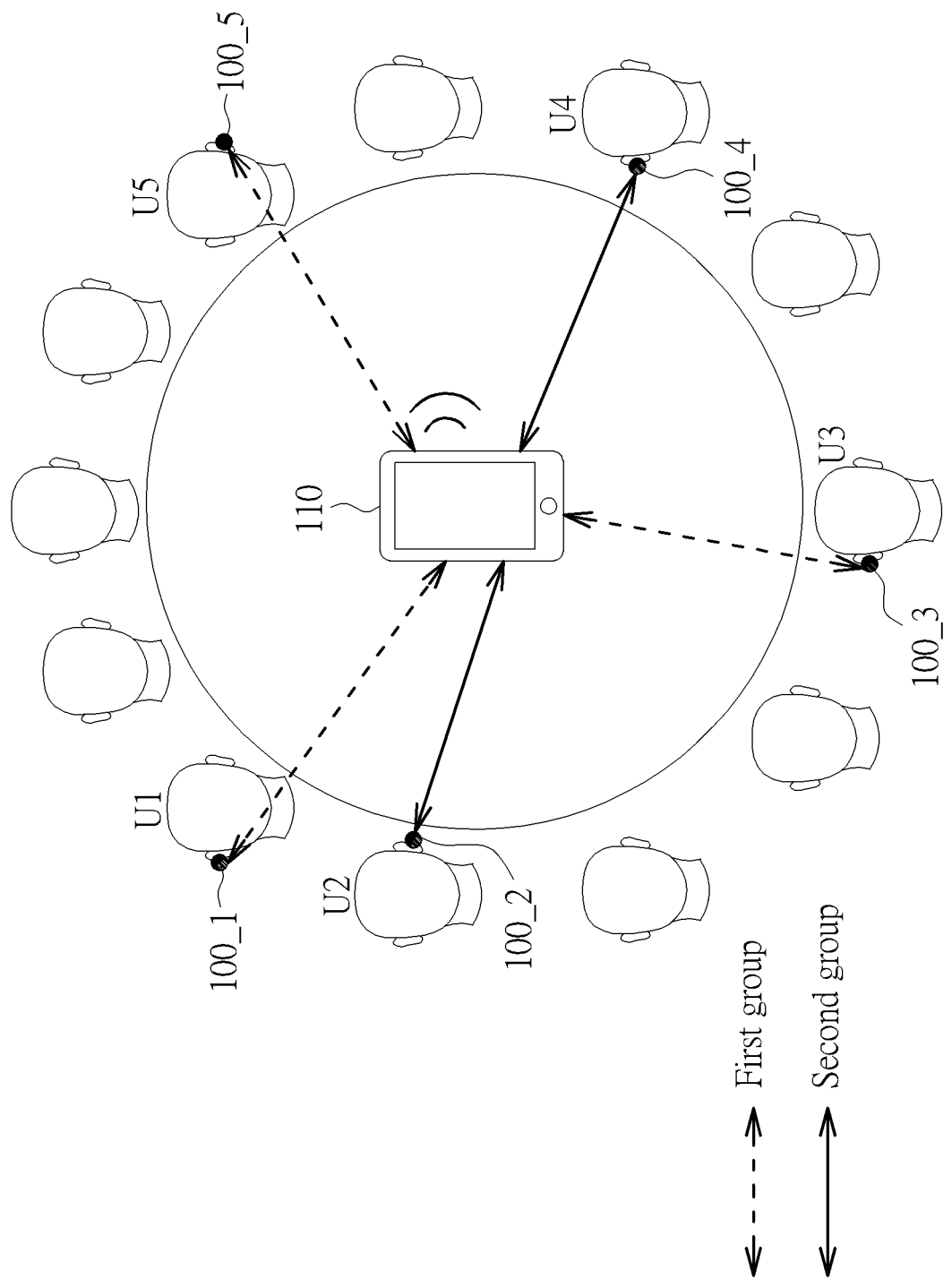
FIG. 3 is a diagram showing an example of multiple earphone devices paired with a single one mobile phone device according to an embodiment of the invention.

In another embodiment, more than two earphone devices paired with a single one mobile phone device can use by more than two different users/persons in the walkie-talkie mode to perform voice communication in one voice group or respectively in different voice groups to implement different group talks/conversations. FIG. 3 is a diagram showing an example of multiple earphone devices paired with a single one mobile phone device according to an embodiment of the invention. Each of the earphone devices 100_1, 100_2, 100_3, 100_4, and 100_5, respectively used by users U1, U2, U3, U4, and U5, is implemented by the wearable electronic device 100 in FIG. 1. The operations and circuit components of the wearable electronic device 100 are identical to those of each of the earphone devices 100_1, 100_2, 100_3, 100_4, and 100_5.

As shown in FIG. 3, within the signal transmission/reception range of the mobile phone device 110, for example, users/persons U1, U3, and U5 respectively wear the earphone devices 100_1, 100_3, and 100_5 may negotiate with each other to manually operate the mobile phone device 110 by at least one user/person to use and operate the user interface 125 to classify their earphone devices 100_1, 100_3, and 100_5 into the same voice communication group such as the first voice group when each of the earphone devices 100_1, 100_3, and 100_5 is paired with the mobile phone device 110 before entering the walkie-talkie mode. When the earphone devices 100_1, 100_3, and 100_5 are classified into the same voice communication group such as the first voice group, the mobile phone device 110 is arranged to send unique information of other different earphone devices of the first voice group to each earphone device (i.e. each member device) in the first voice group. For instance, the processing unit 120 in practice classifies the MAC addresses of the earphone devices 100_1, 100_3, and 100_5 into a first walkie-talkie group, transmits the MAC addresses of the earphone devices 100_1, 100_3 to the earphone device 100_5, transmits the MAC addresses of the earphone devices 100_1, 100_5 to the earphone device 100_3, and transmits the MAC addresses of the earphone devices 100_3, 100_5 to the earphone device 100_1, so that the information database INFO1 recorded in the earphone device 100_5 comprises MAC addresses of earphone devices 100_1, 100_3, the information database INFO1 recorded in the earphone device 100_3 comprises MAC addresses of earphone devices 100_1, 100_5, and similarly the information database INFO1 recorded in the earphone device 100_1 comprises MAC addresses of earphone devices 100_3, 100_5.

In detail, the database INFO1 in each of the earphone devices 100_1, 100_3, and 100_5 for example can be represented by the following table:

| Group info | Address of Member device | Address of mobile phone | Name info |
|---|---|---|---|
| A1 | ADDR_1 | ADDR_110 | N_1 |
|  | ADDR_3 | ADDR_110 | N_3 |
|  | ADDR_5 | ADDR_110 | N_5 |

In the table, the walkie-talkie group 'A1' for example comprises three member devices (e.g. earphone devices 100_1, 100_3, and 100_5) having the MAC addresses ADDR_1, ADDR_3, and ADDR_5, the same MAC address ADDR_110 of mobile phone device 110, and different name information such as N_1, N_3, and N_5 respectively representing different users U1, U3, and U5.

Similarly, for a second voice group different from the first voice group, users/persons U2, U4 respectively wear the earphone devices 100_2, 100_4 may negotiate with each other to manually operate the mobile phone device 110 by at least one user/person to use and operate the user interface 125 to classify their earphone devices 100_2, 100_4 into the same voice communication group such as the second voice group when each of the earphone devices 100_2, 100_4 is paired with the mobile phone device 110 before entering the walkie-talkie mode. When the earphone devices 100_2, 100_4 are classified into the same voice communication group such as the second voice group, the mobile phone device 110 is arranged to send unique information of other different earphone device (s) of the second voice group to each earphone device (i.e. each member device) in the second voice group. For instance, the processing unit 120 in practice classifies the MAC addresses of the earphone devices 100_2, 100_4 into a second walkie-talkie group, transmits the MAC address of the earphone device 100_2 to the earphone device 100_4, transmits the MAC address of the earphone device 100_4 to the earphone device 100_2, so that the information database INFO1 recorded in the earphone device 100_2 comprises MAC address of earphone device 100_4 and the information database INFO1 recorded in the earphone device 100_4 comprises MAC address of earphone device 100_2. The information database INFO1 does not comprise MAC addresses of other electronic devices not belonging to the same voice group even though the other electronic devices are also within the signal transmission/reception range of the mobile phone device 110 and paired with the mobile phone device 110 via Bluetooth communication.

The database INFO1 in each of the earphone devices 100_2 and 100_4 for example can be represented by the following table:

| Group info | Address of Member device | Address of mobile phone | Name info |
|---|---|---|---|
| A2 | ADDR_2 | ADDR_110 | N_2 |
|  | ADDR_4 | ADDR_110 | N_4 |

In the table, the walkie-talkie group 'A2' for example comprises two member devices (e.g. earphone devices 100_2 and 100_4) having the MAC addresses ADDR_2 and ADDR_4, the same MAC address ADDR_110 of mobile phone device 110, and different name information such as N_2 and N_4 respectively representing different users U2 and U4.

For example, when the earphone devices 100_1, 100_3, and 100_5 are in the walkie-talkie mode, a voice packet signal, sent from the earphone device 100_1, carries its MAC address ADDR_1 of the earphone device 100_1, and the earphone device e.g. 100_3 can receive the voice packet signal and then the processing circuit 120 in the earphone device 100_3 can compare the MAC address ADDR_1 included within the voice packet signal with the recorded information database INFO1 to determine whether to play the voices/sounds of the voice packet signal for the user U3. Since the MAC address ADDR_1 is found in the recorded information database INFO1 of the earphone device 100_3, the earphone device 100_3 can play the voices/sounds of the voice packet signal for the user U3. The operation of earphone device 100_5 is similar and not detailed for brevity. For the earphone devices 100_2, 100_4, since the MAC address ADDR_1 is not found in the information database INFO1 of earphone devices 100_2 and 100_4, the earphone devices 100_2 and 100_4 determines discarding the voice packet signals (generated by the earphone devices 100_1, 100_3, and 100_5) and do not play the voices/sounds for the users U2 and U4 after comparing the MAC addresses carried within the voice packet signals with their recorded information database INFO1. Accordingly, by doing so, this can achieve different voice group talks in the walkie-talkie mode.

Further, in some embodiments, if the earphone device 100_1 in FIG. 3 is classified into the second voice group mentioned above, then the information table INFO1 of the earphone device 100_1 is represented in the following table:

| Group info | Address of Member device | Address of mobile phone | Name info |
|---|---|---|---|
| A1 | ADDR_1 | ADDR_110 | N_1 |
|  | ADDR_3 | ADDR_110 | N_3 |
|  | ADDR_5 | ADDR_110 | N_5 |
| A2 | ADDR_1 | ADDR_110 | N_1 |
|  | ADDR_2 | ADDR_110 | N_2 |
|  | ADDR_4 | ADDR_110 | N_4 |

Figure 4:
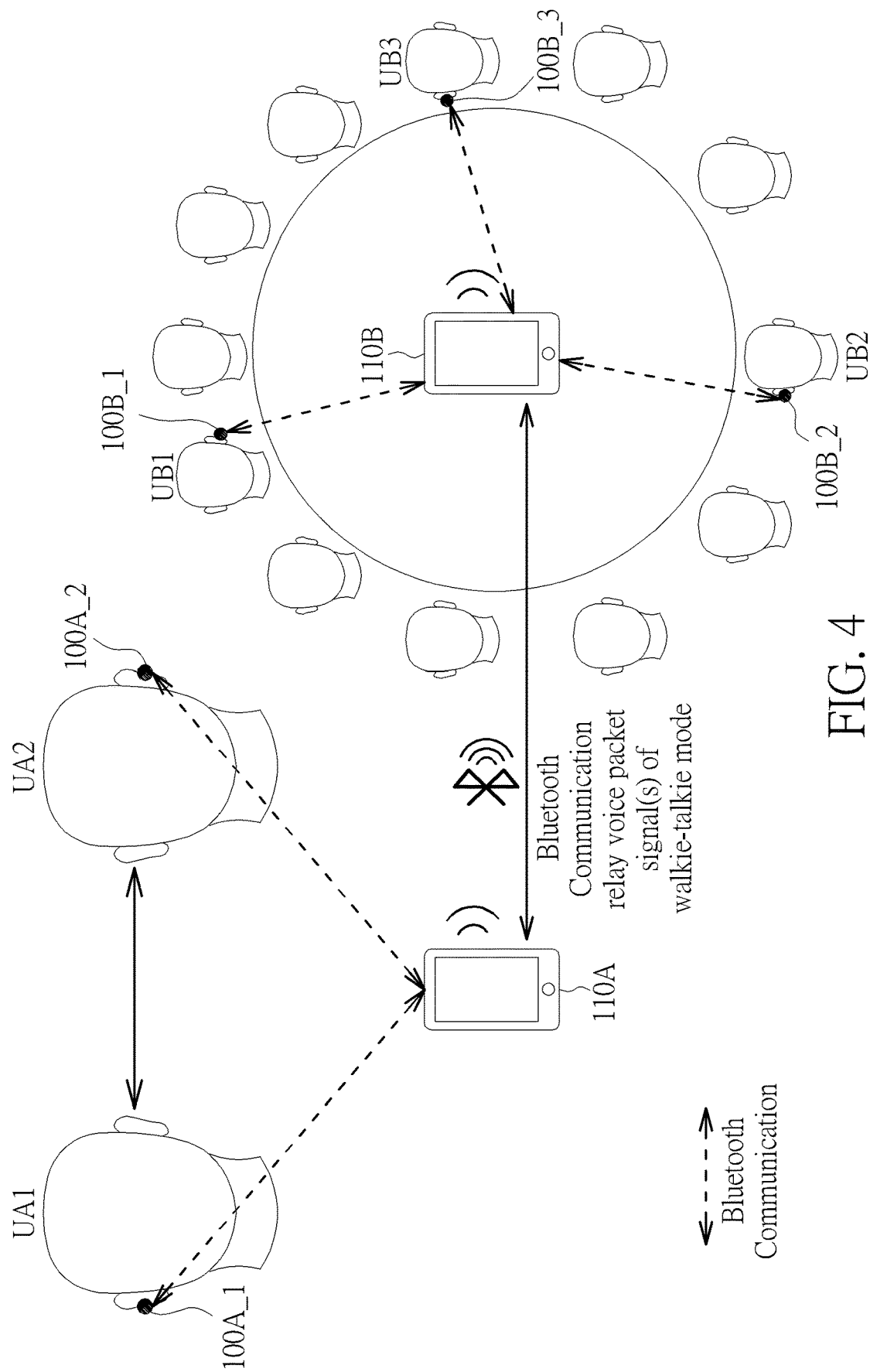
FIG. 4 is a diagram of an example of multiple users/persons belonging to the same group talking with each other in the walkie-talkie mode by using two mobile phone devices to transfer/relay voice packet signals of the walkie-talkie mode according to an embodiment of the invention.

Further, in one embodiment, the walkie-talkie mode can support the transmission of voice packet signals in different mobile phone devices via Bluetooth communication standard. FIG. 4 is a diagram of an example of multiple users/persons corresponding to the same voice group talking with each other in the walkie-talkie mode by using two mobile phone devices to transfer/relay voice packet signals of the walkie-talkie mode according to an embodiment of the invention. Each of earphone devices 100A_1, 100A_2, 100B_1, 100B_2, and 100B_3 comprises the same circuit components of the wearable electronic device 100, and is not shown on FIG. 4 for brevity. Each of mobile phone devices 110A and 110B comprises the same circuit components of the mobile phone device 110, and is not shown on FIG. 4 for brevity. Each of earphone devices 100A_1, 100A_2, 100B_1, 100B_2, and 100B_3 can detect whether a distance between itself and any device among the other earphone devices is larger than a specific distance threshold so as to determine whether to enter the walkie-talkie mode.

As shown in FIG. 4, the group setting of the walkie-talkie mode can be configured in advance before the wearable electronic devices 100A_1, 100A_2, 100B_1, 100B_2, and 100B_3 (e.g. earphone devices) enter the walkie-talkie mode. For example, the devices of users UA1, UA2, UB1, UB2, and UB3 may be classified into the same voice group by at least one of themselves by activating a specific application software running on and executed by the processing units 110 in the mobile phone devices 110A and 110B to exchange and share the MAC addresses of the earphone devices, MAC addresses of mobile phone devices, and/or other corresponding information such as name information for the corresponding earphone devices 100A_1, 100A_2, 100B_1, 100B_2, and 100B_3. The information database INFO1 recorded in each of the earphone devices 100A_1, 100A_2, 100B_1, 100B_2, and 100B_3 may be shown in the following table:

| Group info | Address of Member device | Address of mobile phone | Name info |
|---|---|---|---|
| A3 | ADDR_UA1 | ADDR_110A | N_UA1 |
|  | ADDR_UA2 | ADDR_110A | N_UA2 |
|  | ADDR_UB1 | ADDR_110B | N_UB1 |
|  | ADDR_UB2 | ADDR_110B | N_UB2 |
|  | ADDR_UB3 | ADDR_110B | N_UB3 |

In the table, the walkie-talkie group 'A3' for example comprises five member devices (e.g. earphone devices 100A_1, 100A_2, 100B_1, 100B_2, and 100B_3) having the MAC addresses ADDR_UA1, ADDR_UA2, ADDR_UB1, ADDR_UB2, ADDR_UB3, two different MAC addresses ADDR_110A and ADDR_110B of two mobile phone devices 110A and 110B, and different name information such as N_UA1, N_UA2, N_UB1, N_UB2, and N_UB3.

For example, when the earphone devices 100A_1, 100A_2, 100B_1, 100B_2, and 100B_3 are in the walkie-talkie mode, a voice packet signal, sent from the earphone device 100A_1, carries walkie-talkie group information such as "A3", its MAC address ADDR_UA1 of the earphone device 100A_1 and/or information of destination address of mobile phone device(s) comprising the MAC addresses ADDR_110A and ADDR_110B of the mobile phone devices 110A and 110B.

When receiving the voice packet signal sent from the earphone device 100A_1, the processing unit 120 in the mobile phone device 110A controls its communication unit 115 to broadcast the voice packet signal to earphone devices within its signal range and to reproduce the voice packet signal to relay and transfer the voice packet signal from the mobile phone device 110A to the mobile phone device 110B via the Bluetooth communication based on the received information of destination address of mobile phone device(s), i.e. ADDR_110A and ADDR_110B. Then, after receiving the voice packet signal from mobile phone device 110A, the mobile phone device 110B is arranged to broadcast such voice packet signal to the earphone devices within its signal range. In this situation, the earphone device 100A_2 can receive the voice packet signal and plays voice message(s) associated with the user UA1 for the user UA2 so that the user UA2 can know the voice communication of walkie-talkie group "A3" in the walkie-talkie mode. In addition, the earphone devices 100B_1, 100B_2, and 100B_3 can also receive the voice packet signal and plays voice message(s) associated with the user UA1 for the users UB1, UB2, and UB3, respectively.

In another embodiment, for example, the devices of users UA1 and UB2 may be further classified into another voice group. The information database INFO1 recorded in the earphone device 100A_1 may be shown in the following table:

| Group info | Address of Member device | Address of mobile phone | Name info |
|---|---|---|---|
| A3 | ADDR_UA1 | ADDR_110A | N_UA1 |
|  | ADDR_UA2 | ADDR_110A | N_UA2 |
|  | ADDR_UB1 | ADDR_110B | N_UB1 |
|  | ADDR_UB2 | ADDR_110B | N_UB2 |
|  | ADDR_UB3 | ADDR_110B | N_UB3 |
| A4 | ADDR_UA1 | ADDR_110A | N_UA1 |
|  | ADDR_UB2 | ADDR_110B | N_UB2 |

In the table, in addition to the walkie-talkie group 'A3', the walkie-talkie group 'A4' for example comprises two member devices (e.g. earphone devices 100A_1 and 100B_2) having the MAC addresses ADDR_UA1 and ADDR_UB2, two different MAC addresses ADDR_110A and ADDR_110B of two mobile phone devices 110A and 110B, and different name information such as N_UA1 and N_UB2. When receiving the voice packet signal sent from the earphone device 100A_1 for the walkie-talkie group 'A4', the mobile phone device 110A does not broadcast the voice packet signal to other earphone devices within its signal range and is arranged to relay and transfer the voice packet signal from the mobile phone device 110A to the mobile phone device 110B via the Bluetooth communication based on the received information of destination address of mobile phone device(s), i.e. ADDR_110B. Then, after receiving the voice packet signal from mobile phone device 110A, the mobile phone device 110B is arranged to broadcast such voice packet signal to the earphone devices within its signal range. In this situation, the earphone device 100B_2 can receive the voice packet signal and plays voice message(s) associated with the user UA1 for the user UB2 so that the user UB2 can know the voice communication of walkie-talkie group "A4" in the walkie-talkie mode. Other earphone devices 100B_1 and 100B_3 do not receive the voice packet signal since the MAC addresses of the earphone devices 100B_1 and 100B_3 are not in the walkie-talkie group 'A4'.

Figure 5:
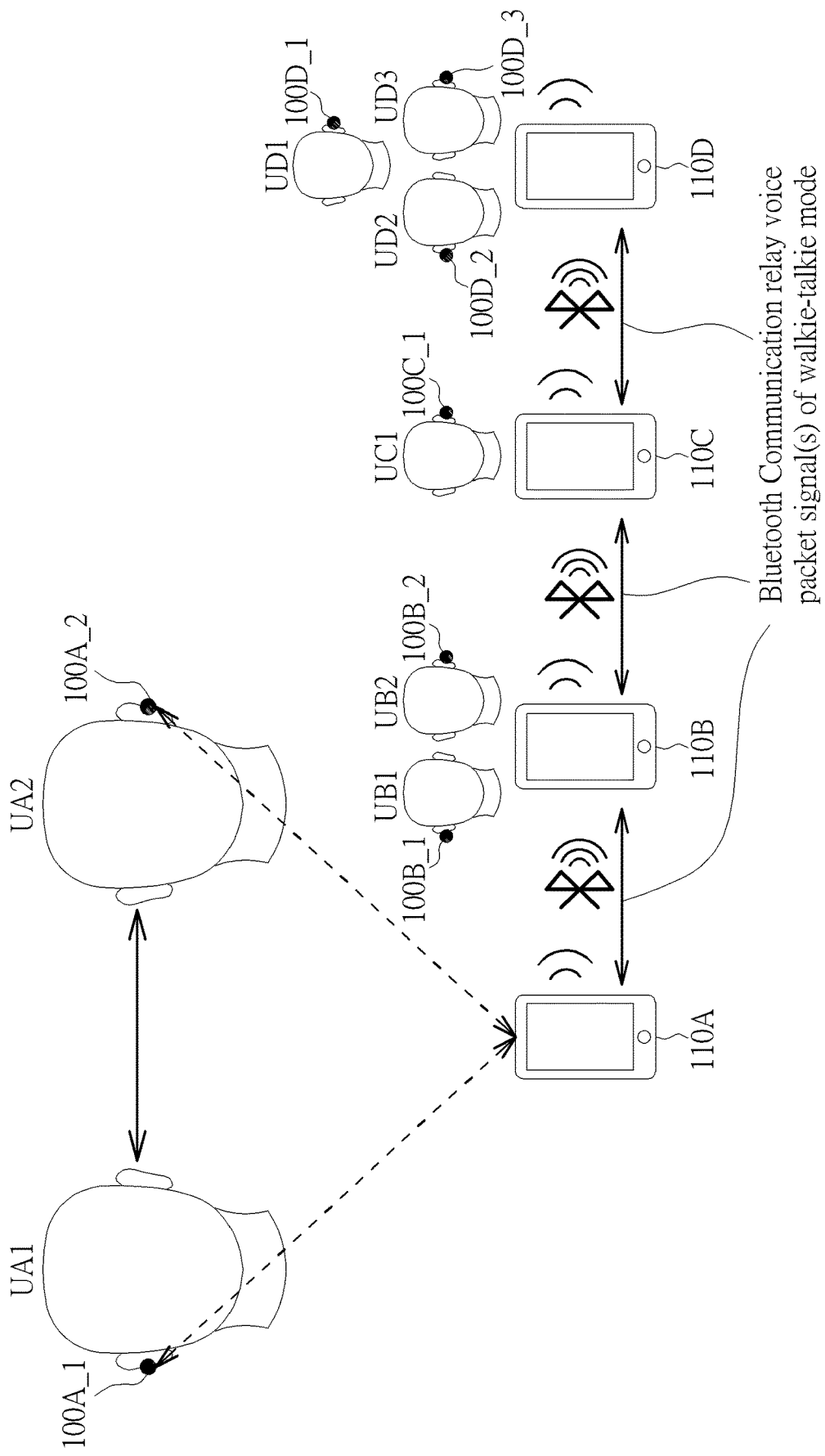
FIG. 5 is a diagram of an example of multiple users/persons belonging to the same group talking with each other in the walkie-talkie mode by using more than two mobile phone devices to transfer/relay voice packet signals of the walkie-talkie mode according to an embodiment of the invention.

Additionally, in one embodiment, the voice packet signal(s) of walkie-talkie mode can be transferred or relayed by one or more mobile phone devices in a mesh network via one or more Bluetooth communication connections. FIG. 5 is a diagram of an example of multiple users/persons belonging to the same group talking with each other in the walkie-talkie mode by using more than two mobile phone devices to transfer/relay voice packet signals of the walkie-talkie mode according to an embodiment of the invention. As shown in FIG. 5, the mobile phone devices 100A, 100B, 100C, and 100D are in a Bluetooth mesh network. Each of earphone devices 100A_1, 100A_2, 100B_1, 100B_2, 100C_1, 100D_1, 100D_2, and 100D_3 comprises the same circuit elements of the earphone device 100, provides the same functions and operation, and can detect whether a distance between itself and any device among the other earphone devices is larger than a specific distance threshold so as to determine whether to enter the walkie-talkie mode. For example, the earphone device 100A_1 may be out of the signal ranges of the earphone devices 100D_1, 100D_2, and 100D_3; however, this is not intended to be a limitation.

For example, the earphone devices 100A_1, 100A_2, 100D_1, 100D_2, and 100D_3, respectively used by the users UA1, UA2, UD1, UD2, and UD3, are classified into the same voice group by using the specific application software based on their unique information such as MAC addresses and corresponding MAC addresses of mobile phone devices 110A and 110D (but not limited). The voice packet signals of the walkie-talkie mode can be relayed by the mobile phone devices 110B and 110C via multiple intermediate Bluetooth communication connections; these signals respectively record destination address (i.e. the MAC addresses of the mobile phone devices 100A and 100D) in the mesh network, and thus can be correctly transmitted between the mobile phone devices 100A and 100D via the other mobile phone devices 100B and 100C. Additionally, for instance, the earphone devices 100B_1, 100B_2, and 100C_1, respectively used by the users UB1, UB2, and UC1, may be classified into another voice group by using the specific application software based on their unique information such as MAC addresses and MAC addresses of corresponding mobile phone devices 110B and 110C (but not limited). The voice packet signals of the walkie-talkie mode can be transmitted between the mobile phone devices 110B and 110C; these signals respectively record destination address (i.e. the MAC addresses of the mobile phone devices 100B and 100C) in the mesh network, and thus can be correctly transmitted between the mobile phone devices 100B and 100C without being transmitted to the mobile phone devices 100A and 100D. The operations of relaying or transferring a voice packet signal based on the MAC address of the mobile phone at destination device is similar to the operations of the embodiment in FIG. 4, and are not detailed for brevity.

Figure 6:
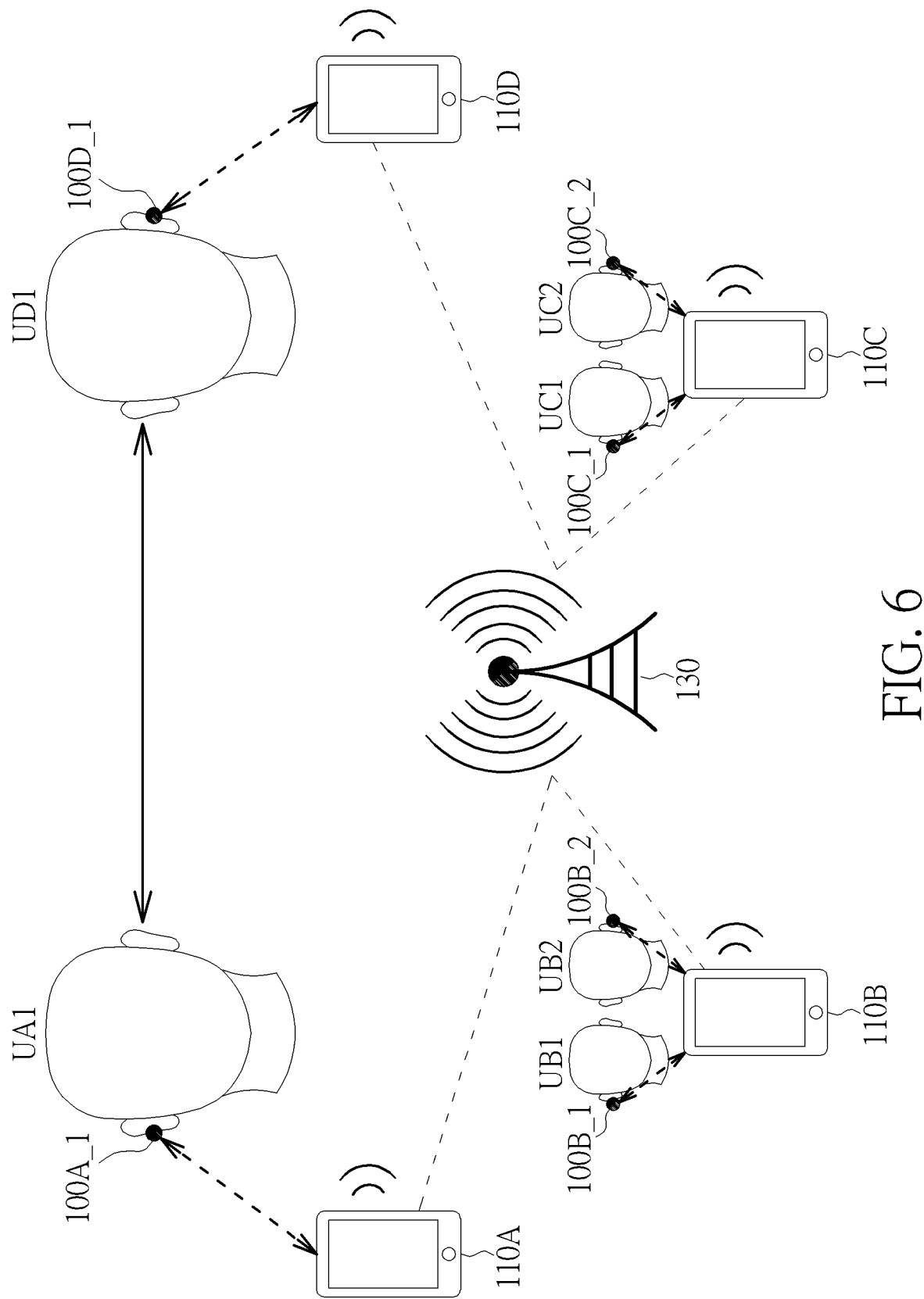
FIG. 6 is a diagram of an example of multiple users/persons belonging to the same group talking with each other in the walkie-talkie mode by using a station of a different wireless communication standard to transfer/relay voice packet signals of the walkie-talkie mode according to an embodiment of the invention.

In one embodiment, the voice packet signals of the walkie-talkie mode can be transmitted via a specific wireless communication standard different from Bluetooth communication standard wherein the specific wireless communication standard may indicate WLAN or wireless broadband communication standards (but not limited). FIG. 6 is a diagram of an example of multiple users/persons corresponding to the same voice group talking with each other in the walkie-talkie mode by using a station of a different wireless communication standard to transfer/relay voice packet signals of the walkie-talkie mode according to an embodiment of the invention. As shown in FIG. 6, the mobile phone devices 110A, 110B, 110C, and 110D can be wireless connected to one or more base stations 130 in a wireless communication system based on the communication of a WLAN system or a wireless broadband system. The mobile phone devices 110A, 110B, 110C, and 110D can be connected via internet communication via the base station(s) 130. Each of earphone devices 100A_1, 100B_1, 100B_2, 100C_1, 100C_2, and 100D_1 comprises the same circuit elements of the earphone device 100, provides the same functions and operation, and can detect whether a distance between itself and any device among the other earphone devices is larger than a specific distance threshold so as to determine whether to enter the walkie-talkie mode. For example, the earphone device 100A_1 may be out of the signal ranges of the earphone devices 100B1_1, 100B_2, 100C_1, 100C_2, and 100D_1; however, this is not intended to be a limitation.

For example, the earphone devices 100A_1, 100B_1, 100B_2, 100C_1, 100C_2, and 100D_1, respectively used by the users UA1, UB1, UB2, UC1, UC2, and UD1, are classified into the same voice group by using the specific application software based on their unique information such as MAC addresses (but not limited). The voice packet signals of the walkie-talkie mode can be relayed by the base station 130. For example, the voice packet signals of the walkie-talkie mode of the Bluetooth communication can be transmitted between one or more mobile phone devices and can be transmitted via the base station 130 by using a data packet signal (carrying the content of such voice packet signal) in the WLAN system or the wireless broadband system. In one embodiment, initially the transmission of the voice packet signals of the walkie-talkie mode can employ the direct transmission between the earphone devices, and then can try to employ Bluetooth communications between mobile phone devices in a Bluetooth mesh network if the direct transmission fails. The transmission may employ the internet to transmit and relay the voice packet signals based on internet communication if the Bluetooth communications between mobile phone devices also fails.

The operation for recording information in the information database INFO1 of each earphone devices 100A_1, 100B_1, 100B_2, 100C_1, 100C_2, and 100D_1 is similar to that mentioned above, and is not detailed for brevity. Further, in other embodiments, the earphone devices (e.g. 100A_1, 100B_1, and 100B_2) corresponding to a portion of users such as UA1, UB1, UB2 can be classified into a voice group while the earphone devices (e.g. 100C_1, 100C_2, and 100D_1) corresponding to a portion of users such as UC1, UC2, UD1 can be classified into a different voice group, and the voice packet signals of the different voice groups can be respectively transferred or relayed by the base station 130.

Further, in other embodiments, the wearable electronic device 100 such as an earphone/earbud device (but not limited) to be worn by a user can be arranged to determine whether a user/person (corresponding to the wearable electronic device 100 itself) contacts another different person(s) (corresponding to other different wearable electronic device(s)). In the embodiments, the definition of a person contacting other person(s) may comprise at least one of the following events: the person physically contacts at least one different person; the person enters a personal/proxemics space of the at least one different person and does not touch the at least one different person; the person has a talk or conversation with at least one different person within a short range and does not touch the at least one different person; the person has an eye contact with at least one different person within a short range and does not have a talk/conversation; the person is facing to the at least one different person within a short range; and so on.

To determine whether the person contacts another different person(s), the wearable electronic device 100 (or processing circuit 101) can detect the distance between the wearable electronic device 100 and other wearable electronic device (s) used or carried by another different person(s) to compare the detected distance with a specific distance threshold. If such detected distance is or becomes smaller than the specific distance threshold, the wearable electronic device 100 determines that the person contacts another different person(s). Instead, if such detected distance is or becomes larger than the specific distance threshold, the wearable electronic device 100 determines that the person does not contact another different person(s). By doing so, the wearable electronic device 100 can determine whether the wearable electronic device 100 itself is neighboring to other wearable electronic device(s). The specific distance threshold for example is equal to 1 meter, 1.5 meter, 2 meters, or 3 meters (but not limited). If it is determined that a different wearable electronic device is a neighbor of the wearable electronic device 100, then the wearable electronic device 100 can decide that a person using/carrying the different wearable electronic device may be located within a personal space or proxemics space of the person using the wearable electronic device 100. In this situation, the wearable electronic device 100 determines that the person using the wearable electronic device 100 may contact the person using/carrying the different wearable electronic device.

In other embodiments, to determine whether the person using the wearable electronic device 100 contact the person using/carrying the different wearable electronic device, the wearable electronic device 100 can be arranged to use the Bluetooth direction finding capability to determine whether the face of the person/user using the device 100 is now facing to the face(s) of the other user(s) carrying/using the different wearable electronic device(s). In practice, the wearable electronic device 100 can calculate the head rotation angle of the person using wearable electronic device 100 and can also calculate the arrival/departure angle of signal(s) of the different wearable electronic device(s), and accordingly can determine whether the face of the person/user using the device 100 is facing to the face (s) of the other user (s) based on the head rotation angle and arrival/departure angle. Further, in other embodiments, the wearable electronic device 100 and the different wearable electronic device(s) may respectively calculate their corresponding persons/users' head rotation angles and then may exchange or share information of the head rotation angles with each other timely or periodically so as to determine whether their corresponding persons/users are face to face. If it is determined that the person/user using the device 100 is facing to the face (s) of the other user(s) in a short range, then the wearable electronic device 100 can determine that the person/user using the device 100 may have a talk/conversation and/or an eye contact with other person(s) within a personal space so as to determine that the person/user using the device 100 contacts the other person(s). It should be noted that the wearable electronic device may further employ the detection of distance between two wearable electronic devices to precisely or exactly detect and determine whether the person/user using the device 100 has a talk/conversation and/or an eye contact with other person (s) in a specific distance range. The modifications are not meant to be limitations of the invention.

In addition, to calculate the total contact time, in practice, the wearable electronic device 100 can be arranged to calculate or derive the total contact time period by configuring a start timing of the total time period for the detected distance becoming smaller than the specific distance threshold and an end timing of the total contact time period for the detected distance becoming larger than the specific distance threshold. In one embodiment, the wearable electronic device 100 can be arranged to calculate or derive the total contact time period by using the Bluetooth direction finding capability. For example, the start of the total contact time period may correspond to the timing of the persons/users becoming face to face and the end of the total contact time period may correspond to the timing of the persons/users becoming not face to face. These modifications are not meant to be limitations of the invention.

After determining that the person using the wearable electronic device 100 contacts different person(s) carrying/using other different device(s), the wearable electronic device 100 may record the unique information (such as ID) of the different wearable electronic device and/or a corresponding total contact time associated with different wearable electronic device as contact information in the memory 103. The contact information may be transmitted to and stored in a memory of the mobile phone device 110 used by the person/user via the Bluetooth communication. Such contact information is used to generate/form a contact history of the person.

For example, in FIG. 3, the earphone device 100_1 may use the distance detection and/or Bluetooth direction finding capability to determine that the person using the earphone device 100_1 may contact another person using the earphone device 100_2, and thus the unique information of the earphone device 100_2 and/or corresponding total contact time may be stored as contact information in the earphone device 100_1 and/or the contact information may be transmitted to and stored in the mobile phone device 110. It should be noted that the unique information of another earphone device (e.g. device 100_3 used by the person U3 which does not contact the person U1) is not stored in the earphone device 100_1 as contact information.

Further, in one embodiment, the contact information may further comprise unique information of a user/person corresponding to the different wearable electronic device and/or unique information of a different type electronic device (e.g. a mobile phone or smart phone) corresponding to the different wearable electronic device. For example, in FIG. 4, if the earphone device 100A_2 used by the person/user UA2 determines that the person UA2 contacts the person UB1 using the earphone device 100B_1, the earphone device 100A_2 may send a request to the different wearable electronic device (i.e. the earphone device 100B_1) to ask for a response associated with unique information of the user/person UB1 and/or a response associated with unique information of a different type electronic device (e.g. the mobile phone device 110B) corresponding to the different wearable electronic device 100B_1. If the above unique information can be exchanged or shared, then the earphone device 100A_2 is arranged to store the unique information into the memory 103 as contact information after receiving the above unique information. The above unique information may be also transmitted from the earphone device 100A_2 to the mobile phone device 110A so that the person/user UA2 using the mobile phone device 110A can know his/her contact history.

Accordingly, once the person/user using the mobile phone device 110 in the future is identified as a patient with suspected or confirmed, the above contact history can be provided and revealed to the hospital or related government department. Based on the full contact history recorded and generated by the wearable electronic device, it is easy to know which people may be likely to be infected by the person/user using the wearable electronic device so as to early identify and prevent disease transmission.

Compared to the prior art, the wearable electronic device based on precise distance detection and Bluetooth direction finding can accurately/precisely determine whether a person may have a talk/conversion and/or eye-contact with other person(s) and/or whether a person may enter a personal space of another person (i.e. more close to the another person), so as to determine whether the person contacts other person(s). The performance of contact history detection is significantly improved since a conventional location tracking system such as WiFi system may merely provide a level of accuracy ranging from three to five meters.

Figure 7:
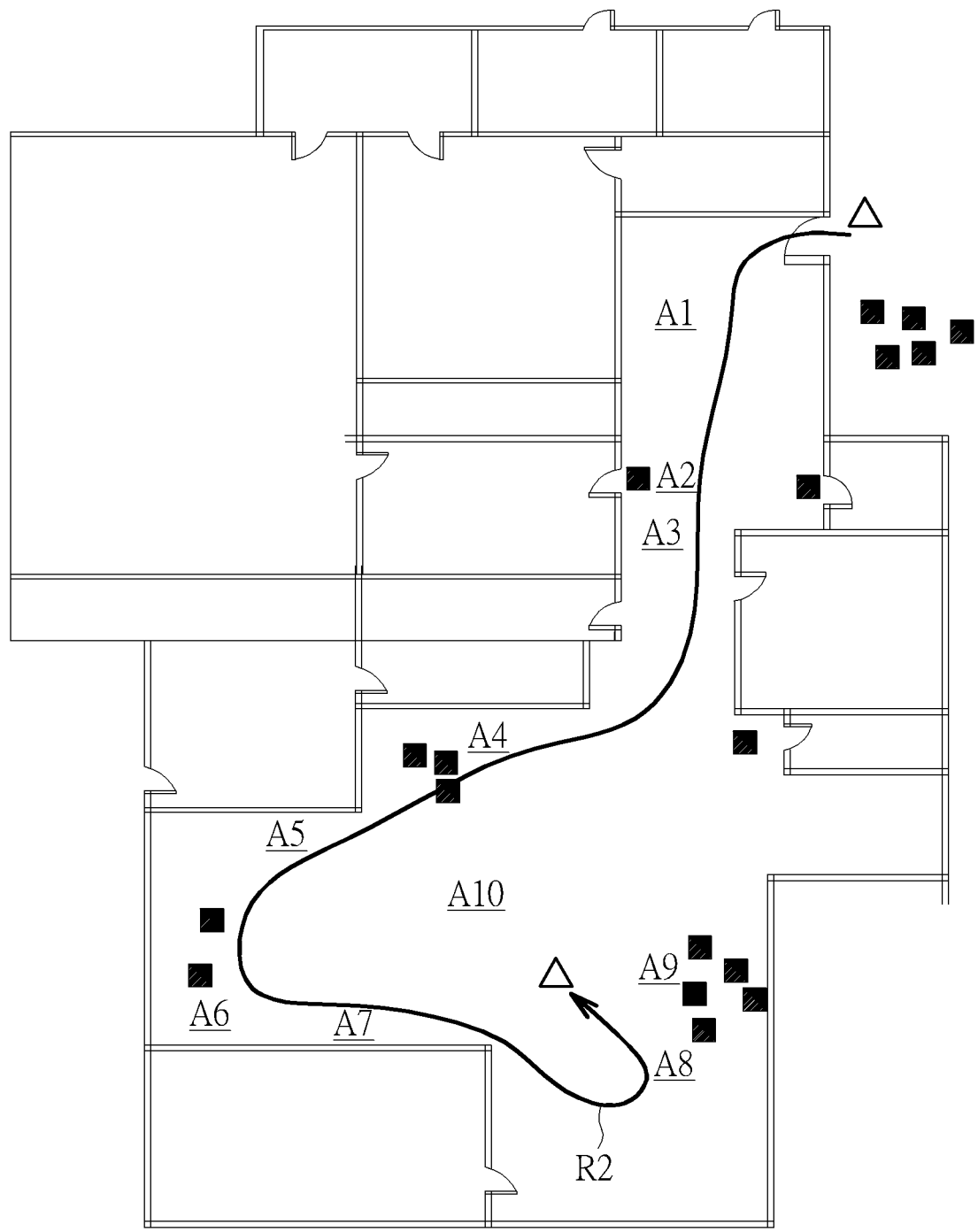
FIG. 7 is a diagram of an example of using the Bluetooth direction finding capability of wearable electronic device to generate and obtain the travel history of the person/user using the wearable electronic device according to an embodiment of the invention.

Further, the wearable electronic device 100 can further use the distance detection and/or Bluetooth direction finding capability to calculate and collect a travel history of the person/user using the wearable electronic device 100 itself. In the embodiments, the travel history comprises at least one of the activity route and activity time of the person/user using the wearable electronic device 100. FIG. 7 is a diagram of an example of using the Bluetooth direction finding capability of wearable electronic device 100 to generate and obtain the travel history of the person/user using the wearable electronic device 100 according to an embodiment of the invention. As shown in FIG. 7, multiple Bluetooth locator stations having Bluetooth communication capabilities (respectively indicated by 'A1', 'A2', 'A3', ..., 'A10', but not limited) may be disposed at different locations within a place such as a tourist factory (but not limited) on FIG. 7. In an example, a visitor (indicated by 'Δ') such as a person/user using or carrying the wearable electronic device 100 may enter the tourist factory to have a chance to experience the factory's history, get up-close and personal with the assembly line, manufacturing process, and enjoy shopping and eating; R2 indicates a walking route of such visitor 'Δ'. Other visitors/persons are indicated by a different sign '■'.

The wearable electronic device 100 or mobile phone device 110 can generate a head rotation angle estimation which can indicate that the person/user is facing towards one or more Bluetooth locator station(s) on FIG. 7 by detecting and calculating the rotation angle information mentioned above real-timely. For example, the visitor 'Δ' may go through the different locations which the different Bluetooth locator stations ('A1', 'A2', 'A3', ..., 'A10') are disposed. For instance, the visitor 'Δ' may be at or arrive at the location which the Bluetooth locator station 'A1' is disposed at the time such as two o'clock in the afternoon (indicated by '14:00'). In this situation, the wearable electronic device 100 can use the distance detection and/or Bluetooth direction finding capability to detect the distance between the wearable electronic device 100 and Bluetooth locator station 'A1' and/or detect whether the visitor 'Δ' becomes facing towards the Bluetooth locator station 'A1' so as to determine whether the place is a contacted area of the visitor 'Δ'. For example, when detected distance is smaller than a particular distance threshold such as 1 meter, 1.5 meter, or 2 meter (not limited) and/or when the visitor 'Δ' becomes facing towards the Bluetooth locator station 'A1', the wearable electronic device 100 may determine that the corresponding place is a contacted area of the visitor 'Δ'. Then, the wearable electronic device 100 can record/store, the place information, arrival time, total stay/contact time, and departure time corresponding to the place in its memory if it is determined that the place is the contacted area. The above-mentioned travel information stored in the memory can be real-timely and/or periodically provided and transmitted to the mobile phone device 110 used by the visitor 'Δ' to generate and display a travel history for the visitor 'Δ' so that the visitor 'Δ' can know whether he/she arrived at contacted area(s)/location(s) of a patient with suspected or confirmed if the patient entered the factory.

Also, for the Bluetooth locator station 'A1', it can use the distance detection and/or Bluetooth direction finding capability to detect the distance between the wearable electronic device 100 and Bluetooth locator station 'A1' and/or detect whether the visitor 'Δ' becomes facing towards the Bluetooth locator station 'A1' so as to determine and record information of which person, wearable electronic device, and/or mobile phone device may be at or arrive at such place. For example, when it is determined that such place is a contacted area of the visitor 'Δ' by the same way, the Bluetooth locator station 'A1' can record/store one or more unique information of the visitor 'Δ', wearable electronic device 100, and/or mobile phone device 110. Also, the Bluetooth locator station 'A1' can record and store the arrival time, total stay/contact time, and departure time corresponding to the visitor 'Δ'.

Similarly, for each different Bluetooth locator stations 'A2', 'A3', ..., and 'A10', the wearable electronic device 100 can determine whether the corresponding place of each Bluetooth locator station is a contacted area of the visitor 'Δ' and record corresponding information (e.g. the place information, arrival time, total stay/contact time, and/or departure time corresponding to the place), and each Bluetooth locator station can determine whether its place is a contacted area of the visitor 'Δ' and also record and store corresponding information (e.g. unique information of the visitor 'Δ', wearable electronic device 100, and/or mobile phone device 110, the arrival time, total stay/contact time, and/or departure time corresponding to the visitor 'Δ').

The travel information of the visitor 'Δ', respectively recorded or stored in the contacted or pass-by Bluetooth locator station(s) can be provided to generate the travel history of the visitor 'Δ' and the generated travel history can be provided and revealed to the hospital or related government department if the visitor 'Δ' is identified as a patient with suspected or confirmed in the future, so that it is easy to know which people may be likely to be infected to early identify and prevent disease transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voice communication method between a first wearable electronic device and at least one second wearable electronic device via Bluetooth communication standard, comprising:

providing the first wearable electronic device paired with a mobile phone device through the Bluetooth communication standard and the at least one second wearable electronic device paired with the mobile phone device through the Bluetooth communication standard;

determining whether a distance between the first wearable electronic device and the at least one second wearable electronic device is larger than a distance threshold;

controlling the first wearable electronic device and the at least one second wearable electronic device exiting an audio playing mode and then entering a walkie-talkie mode to start a walkie-talkie conversation with the at least one second wearable electronic device when the distance is larger than the distance threshold, the first wearable electronic device and the at least one second wearable electronic device being controlled in the audio playing mode to play an audio packet stream sent from the mobile phone device through the Bluetooth communication standard and do not start the walkie-talkie conversation when the distance is smaller than the distance threshold; and during the walkie-talkie mode using the first wearable electronic device to send voice data from the first wearable electronic device to the at least one second wearable electronic device to make the at least one second wearable electronic device to receive and play the voice data in the walkie-talkie mode for at least one different user.

2. The voice communication method of claim 1, wherein the voice data is directly transmitted from the first wearable electronic device to the at least one wearable electronic device through the Bluetooth communication standard between the first wearable electronic device and the at least one second wearable electronic device.

3. The voice communication method of claim 2, wherein the voice data is instead transmitted from the first wearable electronic device to the mobile phone device and transferred from the mobile phone device to the at least one second wearable electronic device if direct transmission of voice data between the first wearable electronic device and the at least one second wearable electronic device fails.

4. The voice communication method of claim 1, wherein the voice data is transmitted from the first wearable electronic device to the mobile phone device and then transferred from the mobile phone device to the at least one second wearable electronic device.

5. The voice communication method of claim 1, wherein the distance between the first wearable electronic device and the at least one second wearable electronic device is calculated according to a Bluetooth direction finding operation or an radio-frequency (RF) power level of a communication between the first wearable electronic device and the at least one second wearable electronic device.

6. The voice communication method of claim 1, wherein the first wearable electronic device and the at least one second wearable electronic device is classified into a same voice communication group by classifying a media access control (MAC) addresses of the first wearable electronic device and at least one MAC addresses of the at least one second wearable electronic device into a specific walkie-talkie group.

7. The voice communication method of claim 6, wherein a third wearable electronic device is paired with the mobile phone device through the Bluetooth communication standard, and the voice data of the first wearable electronic device is not transmitted to the third wearable electronic device through the Bluetooth communication standard when an MAC address of the third wearable electronic device is not classified into the specific walkie-talkie group even a distance between the third wearable electronic device and the first wearable electronic device is larger than the distance threshold.

8. A first wearable electronic device which is paired with a mobile phone device through Bluetooth communication standard, the mobile phone device being paired with at least one second wearable electronic device through the Bluetooth communication standard, and the first wearable electronic device is capable of communicating with the at least one second wearable electronic device and comprises:
 a communication circuit, for sensing a Bluetooth radio-frequency signal sent from the at least one second wearable electronic device; and
 a processing circuit, coupled to the communication circuit, for:
  determining whether a distance between the first wearable electronic device and the at least one second wearable electronic device is larger than a distance threshold by detecting the Bluetooth radio-frequency signal;
  controlling the first wearable electronic device and the at least one second wearable electronic device exiting an audio playing mode and then entering a walkie-talkie mode to start a walkie-talkie conversation with the at least one second wearable electronic device when the distance is larger than the distance threshold, wherein the first wearable electronic device and the at least one second wearable electronic device are controlled in the audio playing mode to play an audio packet stream sent from the mobile phone device through the Bluetooth communication standard and do not start the walkie-talkie conversation when the distance is smaller than the distance threshold; and
  during the walkie-talkie mode using the communication circuit to send voice data from the first wearable electronic device to the at least one second wearable electronic device to make the at least one second wearable electronic device receive and play the voice data for at least one different user.

9. The first wearable electronic device of claim 8, wherein the voice data is directly transmitted from the first wearable electronic device to the at least one second wearable electronic device through Bluetooth data communication between the first wearable electronic device and the at least one second wearable electronic device.

10. The first wearable electronic device of claim 9, wherein the voice data is instead transmitted from the first wearable electronic device to the mobile phone device and transferred from the mobile phone device to the at least one second wearable electronic device if direct transmission of voice data between the first wearable electronic device and the at least one second wearable electronic device fails.

11. The first wearable electronic device of claim 8, wherein the voice data is transmitted from the first wearable electronic device to the mobile phone device and then transferred from the mobile phone device to the at least one second wearable electronic device.

12. The first wearable electronic device of claim 8, wherein the distance between the first wearable electronic device and the at least one second wearable electronic device is calculated according to a Bluetooth direction finding operation or an radio-frequency (RF) power level of a communication between the first wearable electronic device and the at least one second wearable electronic device.

13. The first wearable electronic device of claim 8, wherein the first wearable electronic device and the at least one second wearable electronic device are classified as a same voice communication group by classifying an MAC addresses of the first wearable electronic device and at least one MAC addresses of the at least one second wearable electronic device into a specific walkie-talkie group of the walkie-talkie mode.

14. The first wearable electronic device of claim 13, wherein a third wearable electronic device is paired with the mobile phone device through the Bluetooth communication standard, and the voice data of the first wearable electronic device is not transmitted to the third wearable electronic device through the Bluetooth communication standard when an MAC address of the third wearable electronic device is not classified into the specific walkie-talkie group even a distance between the third wearable electronic device and the first wearable electronic device is larger than the distance threshold.

\* \* \* \* \*